(12) United States Patent
Yokoyama et al.

(10) Patent No.: US 10,680,488 B2
(45) Date of Patent: Jun. 9, 2020

(54) IN-VEHICLE DRIVE DEVICE WITH COOLING CHANNELS

(71) Applicant: NISSAN MOTOR CO., LTD., Yokohama-shi, Kanagawa (JP)

(72) Inventors: Nobuaki Yokoyama, Kanagawa (JP); Hirofumi Shimizu, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/574,576

(22) PCT Filed: May 20, 2015

(86) PCT No.: PCT/JP2015/064425
§ 371 (c)(1),
(2) Date: Nov. 16, 2017

(87) PCT Pub. No.: WO2016/185575
PCT Pub. Date: Nov. 24, 2016

(65) Prior Publication Data
US 2018/0159403 A1 Jun. 7, 2018

(51) Int. Cl.
*H02K 5/20* (2006.01)
*H02K 9/19* (2006.01)
*H02K 11/33* (2016.01)
*H02K 5/22* (2006.01)

(52) U.S. Cl.
CPC ............... *H02K 5/20* (2013.01); *H02K 5/225* (2013.01); *H02K 9/19* (2013.01); *H02K 11/33* (2016.01)

(58) Field of Classification Search
CPC ............ H02K 5/20; H02K 9/19; H02K 9/193; H02K 9/197; H02K 11/33

USPC ........................................................... 310/58
See application file for complete search history.

(56) References Cited

U.S. PATENT DOCUMENTS

| 7,679,234 B1* | 3/2010 | Tilton | H02K 9/19 |
| | | | 165/104.33 |
| 9,118,227 B2 | 8/2015 | Nagao et al. | |
| 9,337,706 B2 | 5/2016 | Miyama et al. | |
| 2007/0273220 A1* | 11/2007 | Koyama | H02K 5/20 |
| | | | 310/58 |
| 2011/0169352 A1* | 7/2011 | Nagao | H02K 5/20 |
| | | | 310/59 |
| 2013/0049495 A1 | 2/2013 | Matsuo | |

(Continued)

FOREIGN PATENT DOCUMENTS

| CN | 102130542 A | 7/2011 |
| CN | 103107629 A | 5/2013 |

(Continued)

OTHER PUBLICATIONS

Machine translation of JP 2005020881 A (Jan. 2005). (Year: 2005).*

*Primary Examiner* — Michael Andrews
(74) *Attorney, Agent, or Firm* — Foley & Lardner LLP

(57) ABSTRACT

A drive device of the present invention includes: an electric motor including a cooling channel; a power conversion unit that converts electric power from a power supply and outputs electric power to be supplied to the electric motor; and a supporting member fixed to the electric motor with the power conversion unit mounted on the supporting member. The supporting member includes a cooling channel connected to the cooling channel of the electric motor.

8 Claims, 10 Drawing Sheets

(56) References Cited

U.S. PATENT DOCUMENTS

| | | |
|---|---|---|
| 2013/0119832 A1 | 5/2013 | Nagao et al. |
| 2014/0077633 A1 | 3/2014 | Nagao et al. |
| 2014/0232217 A1 | 8/2014 | Miyama et al. |
| 2015/0199376 A1 | 7/2015 | Matsuo |

FOREIGN PATENT DOCUMENTS

| | | | |
|---|---|---|---|
| DE | 19645635 C1 | | 4/1998 |
| DE | 10 2010041589 A1 | | 3/2012 |
| DE | 10 2011081511 A1 | | 2/2013 |
| DE | 10 2012 218 444 A1 | | 4/2014 |
| EP | 3 203 614 A1 | | 8/2017 |
| JP | 2005-20881 A | | 1/2005 |
| JP | 2005020881 A | * | 1/2005 |
| JP | 2006-174572 A | | 6/2006 |
| JP | 2006-197781 A | | 7/2006 |
| JP | 2007-306741 A | | 11/2007 |
| JP | 2011-147253 A | | 7/2011 |
| JP | 2011-167025 A | | 8/2011 |
| JP | 2011-182480 A | | 9/2011 |
| JP | 2013-188030 A | | 9/2013 |
| KR | 20110083554 A | | 7/2011 |
| WO | WO-2013/042486 A1 | | 3/2013 |

* cited by examiner

FIG. 3
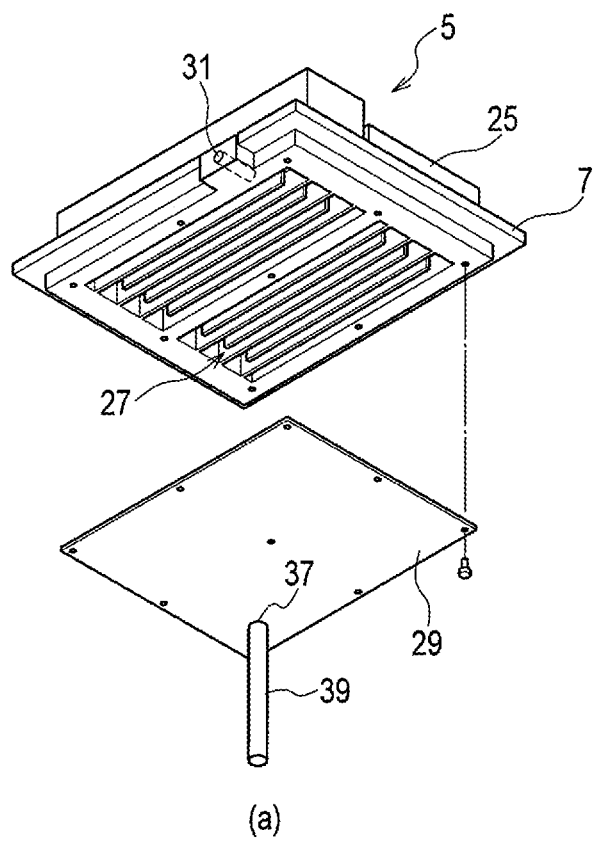
(a)
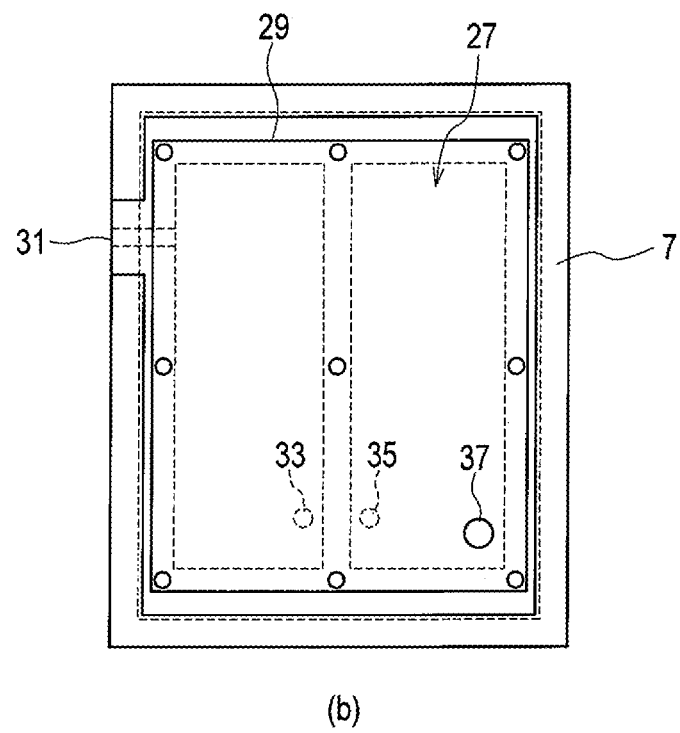
(b)

IN-VEHICLE DRIVE DEVICE WITH COOLING CHANNELS

TECHNICAL FIELD

The present invention relates to a drive device in which an electric motor and a power conversion unit are formed integrally with each other.

BACKGROUND ART

There has conventionally been proposed a structure for directly cooling a power module by means of a cooling channel provided in the outer periphery of an electric motor, and Patent Literature 1 has been disclosed as a rotating electric machine system with such a structure. In the case of such a structure, electronic components such as a sensor, a power module, and a smoothing capacitor are directly fixed to a housing for the electric motor. Thus, it is necessary to perform the mounting of the electronic components in the process of manufacturing the electric motor. Moreover, it is also necessary to perform steps of connecting busbars and attaching harnesses in order to electrically connect the electronic components in the process of manufacturing the electric motor.

CITATION LIST

Patent Literature

Patent Literature 1: Japanese Patent Application Publication No. 2011-182480

SUMMARY OF INVENTION

Technical Problem

Handling electronic components, however, requires significantly more strict control of the inside of the manufacturing room than handling mechanical components. Thus, manufacturing the above-mentioned conventional rotating electric machine system has a problem in that a step requiring measures against contamination and static electricity is added to the process of manufacturing the electric motor.

Thus, the present invention has been proposed in view of the above-mentioned circumstances, and an object thereof is to provide a drive device that enables prevention of addition of a step that requires measures against contamination and static electricity to a manufacturing process.

Solution to Problem

To solve the above-mentioned problem, a drive device according to one aspect of the present invention includes: an electric motor including a cooling channel; a power conversion unit that converts electric power from a power supply and outputs electric power to be supplied to the electric motor; and a supporting member fixed to the electric motor with the power conversion unit mounted on the supporting member. Moreover, this supporting member includes a cooling channel connected to the cooling channel of the electric motor.

BRIEF DESCRIPTION OF DRAWINGS

FIG. 3 is a set of views illustrating the structure of a supporting member of the in-vehicle drive device according to the first embodiment of the present invention, part (a) of FIG. 3 being an exploded perspective view and part (b) of FIG. 3 being a back view.

DESCRIPTION OF EMBODIMENTS

First to fifth embodiments employing the present invention will now be described with reference to the drawings. Note that an in-vehicle drive device will be described as an example of a drive device in the embodiment.

First Embodiment

[Configuration of In-Vehicle Drive Device]

Figure 1:
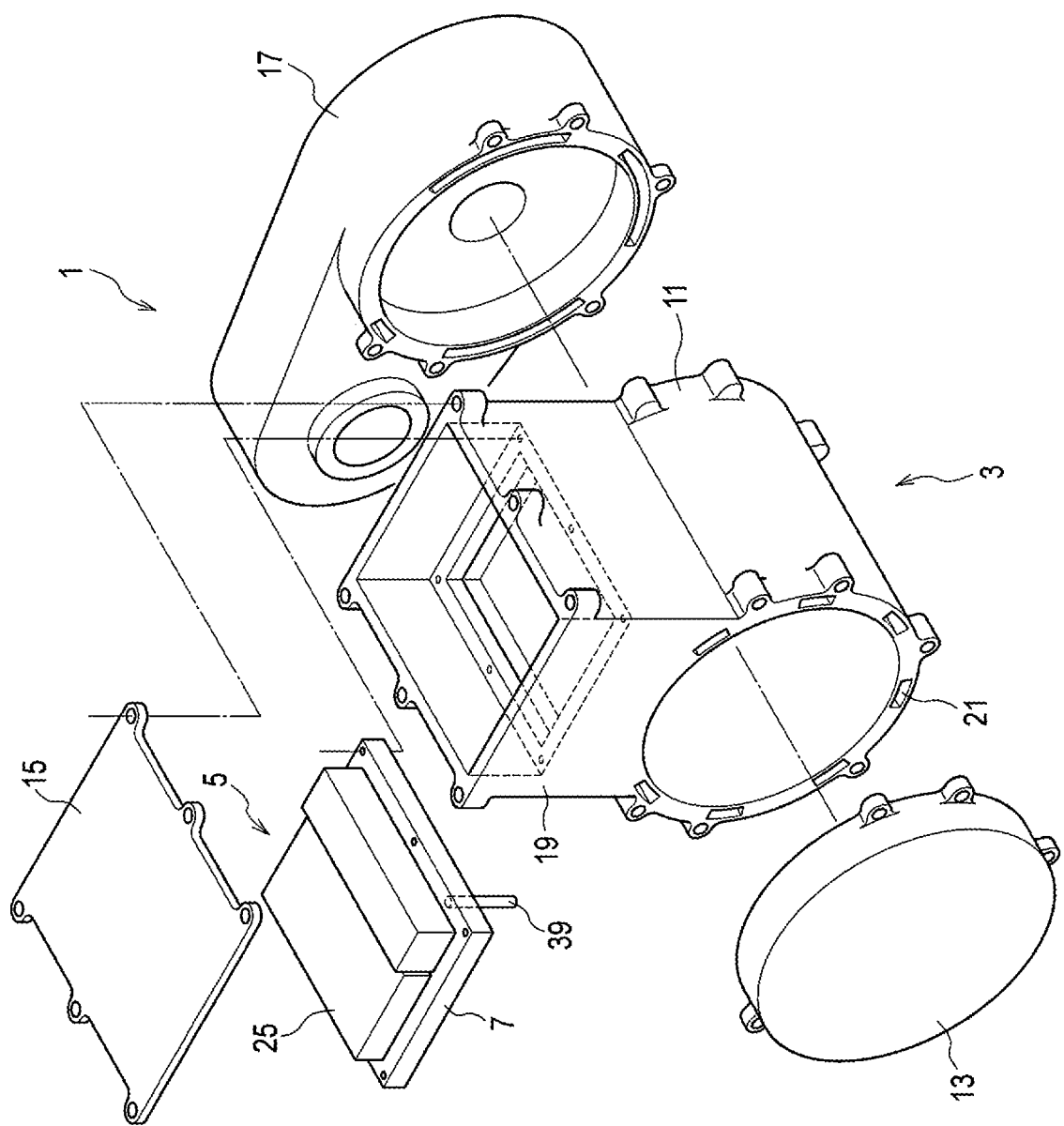
FIG. 1 is an exploded perspective view illustrating the structure of an in-vehicle drive device according to a first embodiment of the present invention.
Figure 2:
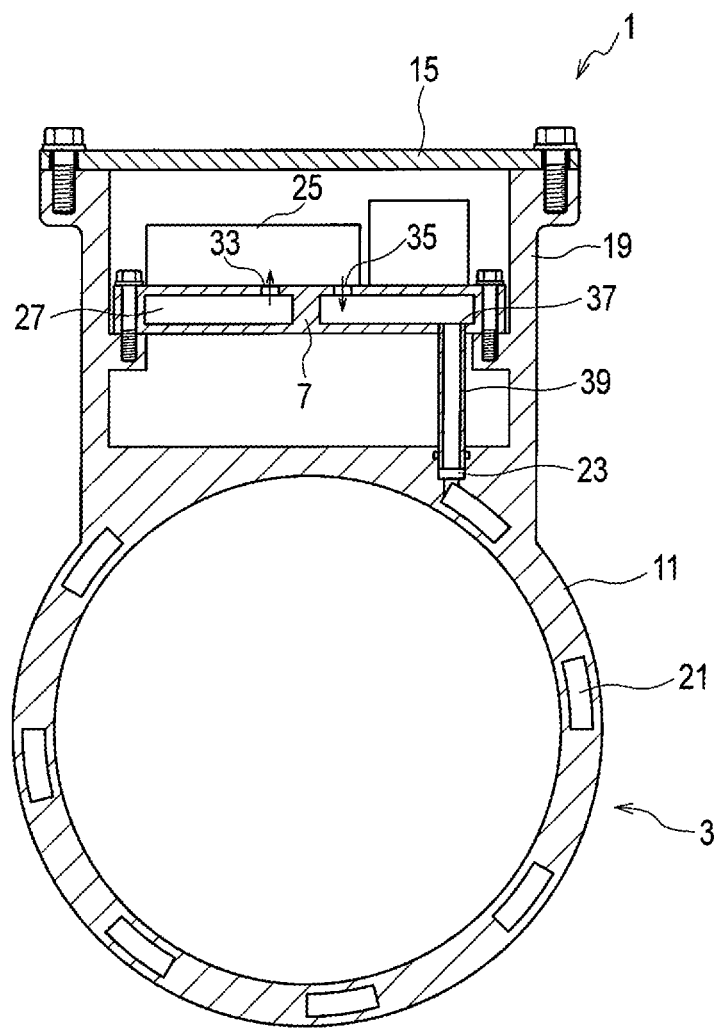
FIG. 2 is a cross-sectional view illustrating the structure of the in-vehicle drive device according to the first embodiment of the present invention.

FIG. 1 is an exploded perspective view illustrating the structure of an in-vehicle drive device according to this embodiment, and FIG. 2 is a cross-sectional view illustrating the structure of the in-vehicle drive device according to this embodiment. As illustrated in FIGS. 1 and 2, an in-vehicle drive device 1 according to this embodiment includes an electric motor 3, a power conversion unit 5, and a supporting member 7.

The electric motor 3 is, for example, a three-phase AC synchronous motor and its exterior shape is formed mainly by an electric-motor housing 11, an end plate 13, and a top plate 15. Moreover, the output shaft of the electric motor 3 is connected to a reducer 17.

A housing portion 19 that houses the power conversion unit 5 and the supporting member 7 is formed in the electric-motor housing 11. This housing portion 19 is a box-shaped housing case formed integrally with the electric-motor housing 11 in an upper portion of the electric-motor housing 11, and is configured to be sealed by the top plate 15 with the power conversion unit 5 and the supporting member 7 housed therein. Also, a cooling channel 21 is formed in the outer periphery of the electric-motor housing 11, and allows cooling water to flow therethrough to cool the electric motor 3. The cooling water flows in from the supporting member 7 through an electric-motor channel inlet 23, circulates in the entire outer periphery of the electric-motor housing 11 to cool the electric motor 3, and then flows out to the outside of the electric motor 3.

The power conversion unit 5 is an inverter formed of a power module 25 and a group of other electronic components, for example, a current sensor, a smoothing capacitor, and a control board, as well as busbars and harnesses connecting given components, and the like. This power conversion unit 5 converts electric power from a power supply and outputs electric power to be supplied to the electric motor 3. Specifically, the power conversion unit 5 converts a DC current supplied from a high-voltage battery for driving the vehicle through a junction box into a three-phase AC current by means of a power semiconductor device and supplies it to the electric motor 3. This three-phase AC current is a current corresponding to a target torque at the frequency synchronized with the number of motor revolutions, and is generated by switching a semiconductor switching element by means of a PWM signal. Note that although a case where the power module 25 in the power conversion unit 5 includes a cooling channel will be described in this embodiment, neither the power conversion unit 5 nor the power module 25 may include a cooling channel.

Figure 11:
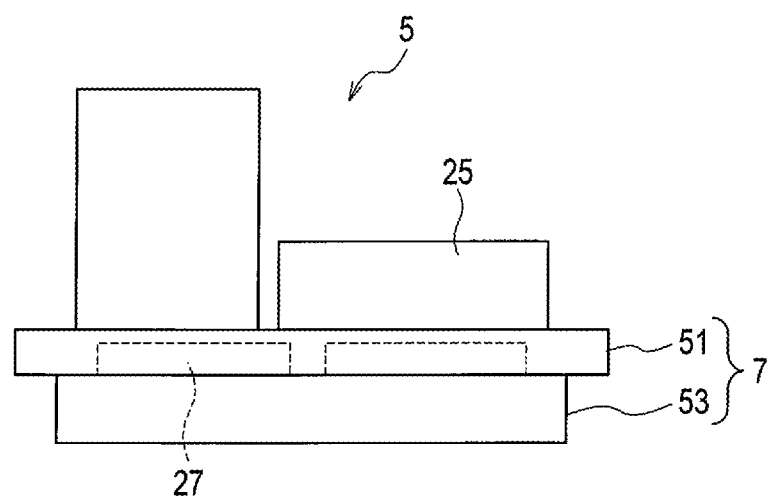
FIG. 11 is a view illustrating an alternative structure of the supporting members constituting the in-vehicle drive devices.

The supporting member 7 is a member configured to be fixed to the electric-motor housing 11 of the electric motor 3 with the power conversion unit 5 mounted on its upper surface, and is, for example, a casting cooler. The supporting member 7 includes a cooling channel 27 configured to be connected to the cooling channel 21 of the electric motor 3, and this cooling channel 27 is formed inside the supporting member 7. As illustrated in FIG. 3, the supporting member 7 is formed in a flat plate shape and has a subassembly structure with the power conversion unit 5 mounted on its upper surface. Also, recessed spaces are provided over the entire back surface of the supporting member 7, and form the cooling channel 27 by being sealed by the bottom plate 29. Provided with partitions in a staggered manner, the cooling channel 27 is in the shape of a groove-shaped channel extending back and forth in the left-right direction. However, the shape of the cooling channel 27 is freely changeable by changing the arrangement of the partitions, and also the partitions may not be provided. Alternatively, as illustrated in FIG. 11, the supporting member 7 may be formed of a channel board 51 and a supporting board 53. The channel board 51 and the supporting board 53 are joined by welding or the like into one piece. Recessed spaces similar to those in FIG. 3 are provided over the entire back surface of the channel board 51, and form a cooling channel 27 by being sealed by the supporting board 53. While the bottom plate 29 illustrated in FIG. 3 is a thin plate for sealing, the supporting board 53 in FIG. 11 has a thickness not only for sealing but also for ensuring strength. Thus, the thickness of the supporting board 53 may be, for example, equal to the channel board 51 or greater than the channel board 51. However, the entire thickness is the same between the supporting member 7 illustrated in FIG. 3 and the supporting member 7 illustrated in FIG. 11. Hence, although the entire thickness is the same, the supporting member 7 illustrated in FIG. 11 has higher strength.

The cooling water flows in from a supporting-member channel inlet 31, flows back and forth in the left-right direction through the cooling channel 27, and flows into the power module 25 from the power-module channel inlet 33 near the center of the supporting member 7. The cooling water having flowed through the power module 25 returns into the cooling channel 27 from a power-module channel outlet 35, flows back and forth in the left-right direction through the cooling channel 27 again, and then flows out of the supporting member 7 through a supporting-member channel outlet 37. The cooling channel 27 of the supporting member 7 and the cooling channel 21 of the electric motor 3 are connected by a connecting pipe 39. The cooling water flowing out of the supporting member 7 flows into the electric motor 3 and used to cool the electric motor 3. Note that the supporting member 7 illustrated in FIG. 11 has a structure similar to the supporting member 7 in FIG. 3, and the cooling water thus flows in a similar manner to cool the electric motor 3.

Here, the power-module channel inlet 33 and the power-module channel outlet 35 in the supporting member 7 are openings provided in accordance with the position of the cooling channel in the power module 25. Thus, if the position of the cooling channel is changed due to a change in structure of the power module 25, the positions of the power-module channel inlet 33 and the power-module channel outlet 35 are also changed in accordance with the changed position of the cooling channel in the power module. Likewise, if the position of the electric-motor channel inlet 23 is changed due to a change in structure of the electric motor 3, the position of the supporting-member channel outlet 37 is changed in accordance with the position of the electric-motor channel inlet 23.

In conventional practices, if the structure of the power module or the electric motor is changed, it will be necessary to design a new pipe for connecting the cooling channels of the power module and the electric motor in accordance with that change, which will be a very heavy burden on manufacturing. In this embodiment, however, even if the structure of the power module or the electric motor is changed, their cooling channels can be connected by simply changing the positions on the supporting member 7 at which holes are bored, since the cooling channel 27 is formed inside the supporting member 7. Hence, it is possible to reduce the burden on designing and greatly enhance versatility. For example, the positions of the power-module channel inlet 33 and the power-module channel outlet 35 may just need to be changed if the structure of the power module 25 is changed, and the position of the supporting-member channel outlet 37 may just need to be changed if the structure of the electric motor 3 is changed.

Meanwhile, the supporting member 7 may be formed of an elastic body. This is to prevent deterioration in heat dissipation performance and water-tightness of the connecting pipe 39 by deformation of the electric-motor housing 11. Generally, the electric-motor housing 11 has high rigidity since it needs strength to withstand in-vehicle conditions. Also, the supporting member 7 needs to be fixed to the electric-motor housing 11 by bolting when fixed to the electric motor 3. On the other hand, before fixing the supporting member 7 to the electric motor 3, a step of inserting the stator of the electric motor 3 in the electric-motor housing 11 by shrink-fitting is performed in consideration of the thermal endurance of the electronic components. Performing the shrink-fitting may possibly deform the electric-motor housing 11. Thus, when the supporting member 7 is fixed, it may possibly need to be forcibly fixed by fastening at spots with dimensional gaps resulting from the shrink-fitting. Then, the supporting member 7 is formed of an elastic body to absorb the deformation of the electric-motor housing 11 and prevent deformation of the connecting pipe 39 so that the supporting member 7 will not affect the thermal transfer and seal performance of the connecting pipe 39 when fixed. In this way, it is possible to prevent deterioration in heat dissipation performance, water-tightness, and the like of the connecting pipe 39.

Further, instead of forming the supporting member 7 from an elastic body, the supporting member 7 may be thinned at the positions where it is bolted, and elastic bodies may be disposed there. In other words, the supporting member 7 may be fixed to the electric motor 3 with elastic bodies interposed therebetween. In this way, an advantageous effect similar to the case of forming the supporting member 7 from an elastic body can be achieved more simply.

[Process of Manufacturing In-Vehicle Drive Device]

Next, a process of manufacturing the in-vehicle drive device 1 according to this embodiment will be described. Firstly in the process of manufacturing the in-vehicle drive device 1 according to this embodiment, the power conversion unit 5 is mounted on the supporting member 7. The power module 25 and a group of other electronic components, for example, a current sensor, a smoothing capacitor, a control board, and the like are mounted on top of the supporting member 7, and busbars and harnesses connecting given components, and the like are attached. In doing so, the cooling channels of the supporting member 7 and the power module 25 may be connected by means of face seals or the like. Also, the connecting pipe 39 may be welded to the supporting member 7.

Usually, handling electronic components requires significantly more strict control of the inside of the room than handling mechanical components in order to avoid contamination and static electricity. In conventional practices, electronic components are mounted directly to an electric motor, and therefore the electronic components need to be mounted inside the manufacturing room for the electric motor. This adds a step that requires measures against contamination and static electricity to the process of manufacturing the electric motor.

In this embodiment, however, the electronic components are mounted on the supporting member 7, and therefore the step of mounting the electronic components can be performed inside a room other than the manufacturing room for the electric motor, for example, the manufacturing room for the inverter. The manufacturing room for the inverter is originally equipped with measures against contamination and static electricity and does not require any new measures to be taken. This prevents addition of a step that requires measures.

Thereafter when exiting the manufacturing room for the inverter, the supporting member 7 may just need to be covered with a simple cover to avoid contamination and static electricity. Moreover, in the manufacturing room for the electric motor, an exclusively divided small room is prepared, in which the simple cover is removed and the supporting member 7 is inserted into the housing portion 19 of the electric-motor housing 11 from above and mounted thereto. Here, the connecting pipe 39 is inserted into the electric-motor channel inlet 23 to unite them at the same time as mounting the entirety. In doing so, water-tightness is ensured with, for example, shaft sealing (rubber packing) or the like. For these operations, the operator may first perform positioning and preparatory operations so that the shaft sealing of the connecting pipe 39 will be achieved, and then bolt the supporting member 7 to fix it. Then, the operator lastly bolts the top plate 15. Consequently, the process of manufacturing the in-vehicle drive device 1 according to this embodiment is completed.

Advantageous Effects of First Embodiment

As described above in detail, in the in-vehicle drive device 1 according to this embodiment, the power conversion unit 5 is mounted on the supporting member 7, and this supporting member 7 is fixed to the electric motor 3. Thus, only the step of fixing the supporting member 7 may be performed in the manufacturing room for the electric motor 3. This can prevent addition of a step that requires measures against contamination and static electricity. Also, the supporting member 7 includes the cooling channel 27, which is connected to the cooling channel 21 of the electric motor 3. Thus, even if the structure of the electric motor 3 is changed, the cooling channels of the electric motor 3 and the supporting member 7 can be connected by simply changing the position of connection of the cooling channel of the supporting member 7. Hence, it is possible to reduce the burden on designing and enhance versatility.

Also, in the in-vehicle drive device 1 according to this embodiment, the power conversion unit 5 includes a cooling channel, and the cooling channel 27 of the supporting member 7 connects the cooling channel 21 of the electric motor 3 and the cooling channel of the power conversion unit 5. Thus, even if the structures of the power conversion unit 5 and the electric motor 3 are changed, the cooling channel between the power conversion unit 5 and the electric motor 3 can be connected by simply changing the position of connection of the cooling channel of the supporting member 7. Hence, it is possible to reduce the burden on designing and enhance versatility.

Further, in the in-vehicle drive device 1 according to this embodiment, the supporting member 7 is formed of an elastic body. Thus, even if the electric-motor housing 11 is deformed by shrink-fitting, the supporting member 7 can absorb the deformation of the electric-motor housing 11. Hence, it is possible to prevent deterioration in heat dissipation performance, water-tightness, and the like of the connecting pipe 39 and the like.

Also, in the in-vehicle drive device 1 according to this embodiment, the supporting member 7 may be fixed to the electric motor 3 with elastic bodies interposed therebetween. Thus, even if the electric-motor housing 11 is deformed by shrink-fitting, the supporting member 7 can absorb the deformation of the electric-motor housing 11. Hence, it is possible to prevent deterioration in heat dissipation performance, water-tightness, and the like of the connecting pipe 39 and the like.

Further, in the in-vehicle drive device 1 according to this embodiment, the cooling channel 27 of the supporting member 7 is formed inside the supporting member 7. Thus, even if the structure of the electric motor 3 is changed, the cooling channels of the electric motor 3 and the supporting member 7 can be connected by simply changing the position of connection of the cooling channel of the supporting member 7. Hence, it is possible to reduce the burden on designing and enhance versatility.

Second Embodiment

Next, an in-vehicle drive device according to the second embodiment of the present invention will be described with reference to drawings. Note that the same constituent components as those in the first embodiment will be denoted by the same reference signs, and detailed description thereof will be omitted.

[Configuration of In-Vehicle Drive Device]

Figure 4:
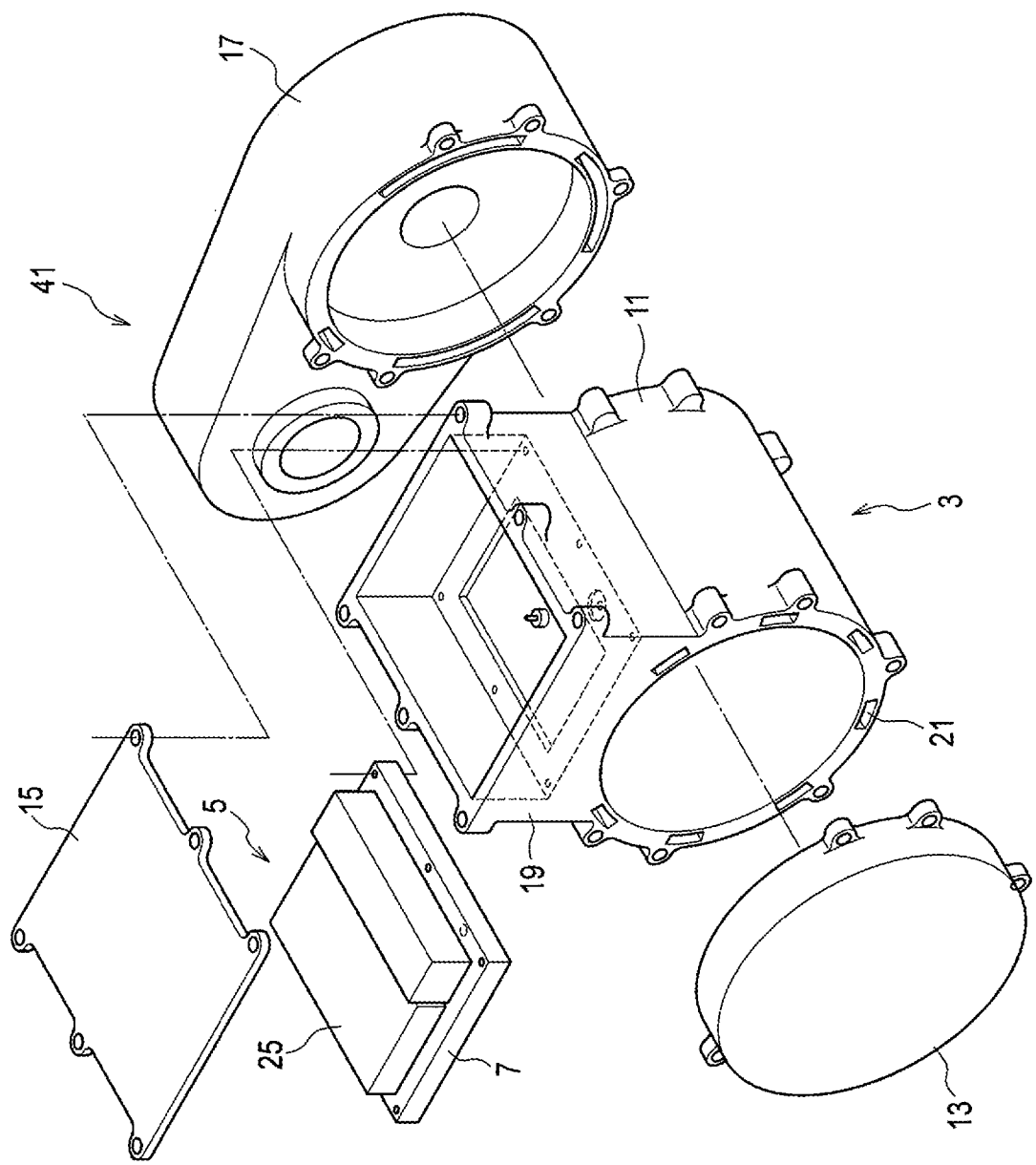
FIG. 4 is an exploded perspective view illustrating the structure of an in-vehicle drive device according to a second embodiment of the present invention.
Figure 5:
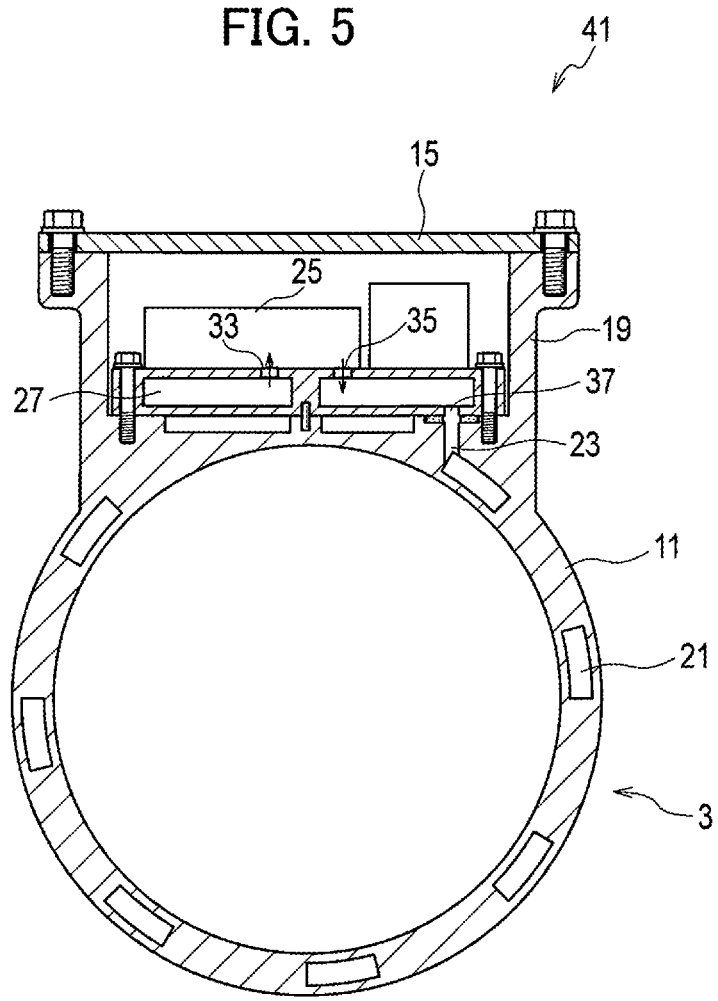
FIG. 5 is a cross-sectional view illustrating the structure of the in-vehicle drive device according to the second embodiment of the present invention.

FIG. 4 is an exploded perspective view illustrating the structure of the in-vehicle drive device according to this embodiment. FIG. 5 is a cross-sectional view illustrating the structure of the in-vehicle drive device according to this embodiment. As illustrated in FIGS. 4 and 5, an in-vehicle drive device 41 according to this embodiment differs from the first embodiment in that a supporting-member channel outlet 37 in a supporting member 7 is connected in direct contact with an electric-motor channel inlet 23 in an electric motor 3.

Specifically, in this embodiment, the supporting member 7 is inserted to the lowest point in a housing portion 19 and fastened and fixed by bolting at a position where the supporting member 7 abuts the outer periphery of the electric motor 3. In doing so, a cooling channel 27 in the supporting member 7 and a cooling channel 21 in the electric motor 3 are connected at the same time as fastening and fixing the supporting member 7, since the supporting-member channel outlet 37 in the supporting member 7 is formed at the position where the supporting-member channel outlet 37 faces the electric-motor channel inlet 23 in the electric motor 3. Meanwhile, the supporting member 7 may have the structure illustrated in FIG. 11.

Here, water-tightness between the supporting-member channel outlet 37 and the electric-motor channel inlet 23 is ensured by means of a face seal. Moreover, a positioning pin with a locating structure is provided around the supporting-member channel outlet 37 and the electric-motor channel inlet 23 to ensure dimensional accuracy at the face sealing portion.

Advantageous Effect of Second Embodiment

As described above in detail, in the in-vehicle drive device 41 according to this embodiment, the supporting-member channel outlet 37 is connected in direct contact with the electric-motor channel inlet 23. This can eliminate the pipe for connecting the cooling channel 27 of the supporting member 7 and the cooling channel 21 of the electric motor 3. Hence, it is possible to reduce the number of constituent components.

Third Embodiment

Next, an in-vehicle drive device according to the third embodiment of the present invention will be described with reference to drawings. Note that the same constituent components as those in the first and second embodiments will be denoted by the same reference signs, and detailed description thereof will be omitted.

[Configuration of In-Vehicle Drive Device]

Figure 6:
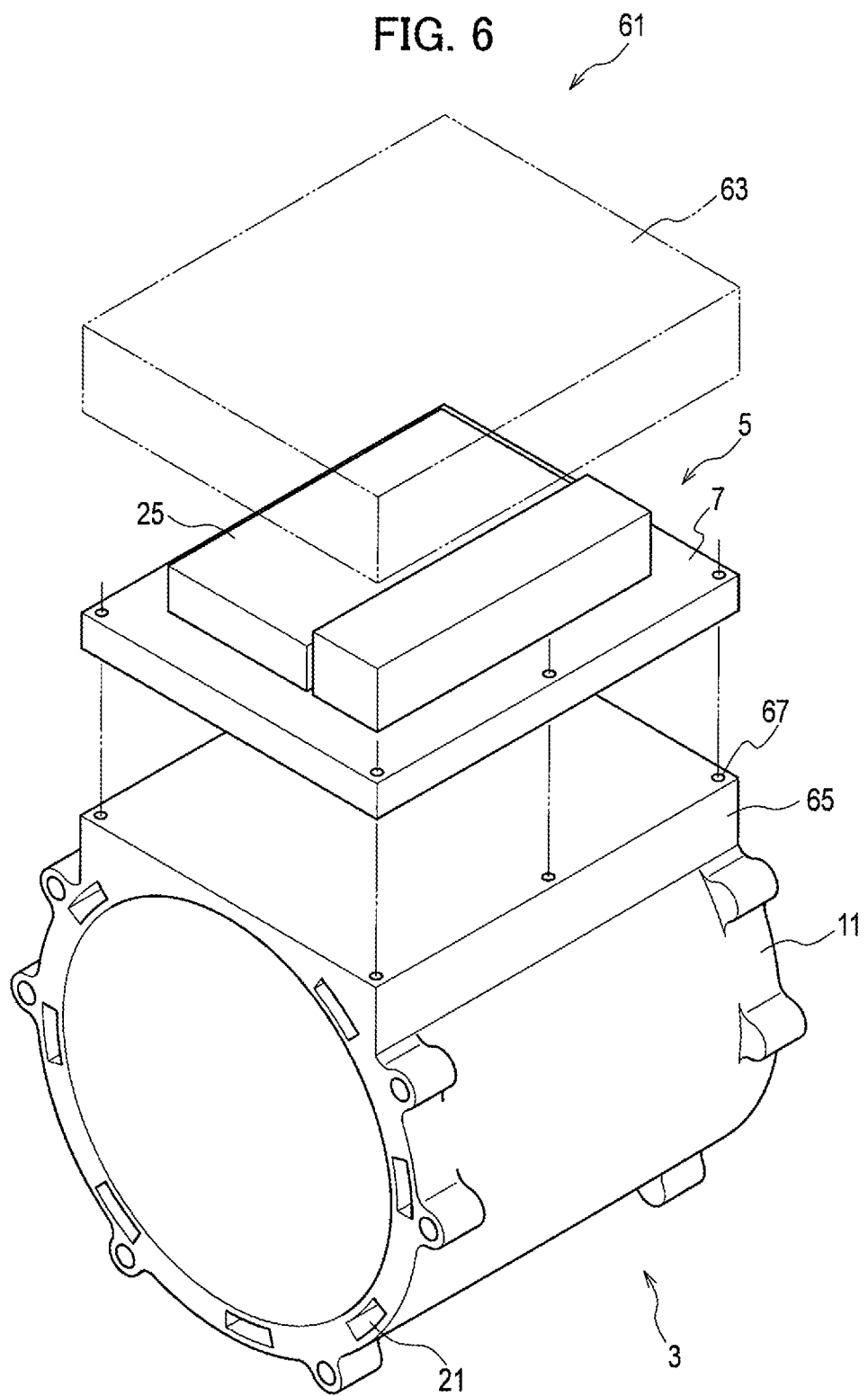
FIG. 6 is an exploded perspective view illustrating a structure of an in-vehicle drive device according to a third embodiment of the present invention.

FIG. 6 is an exploded perspective view illustrating a structure of the in-vehicle drive device according to this embodiment. As illustrated in FIG. 6, an in-vehicle drive device 61 according to this embodiment differs from the first and second embodiments in that a supporting member 7 is disposed on the outer periphery of a cylindrical electric motor 3, and the supporting member 7 is fixed to the electric motor 3 at positions where the distance between the electric motor 3 and the supporting member 7 is long due to the cylindrical shape of the electric motor 3.

In this embodiment, a housing portion 19 is not formed in an electric-motor housing 11; instead, a housing case 63 is provided to the supporting member 7. This housing case 63 is a box-shaped protection case that houses electronic components such as a power module 25 mounted on the supporting member 7, and is placed on the supporting member 7.

Also, a fastening and fixing portion 65 is formed on the electric-motor housing 11 for fixing the supporting member 7 by bolting. This fastening and fixing portion 65 is a pedestal in which threaded holes 67 are formed.

Note that a cooling channel 27 in the supporting member 7 and a cooling channel 21 in the electric motor 3 may be connected by using a pipe as the connecting pipe 39 in the first embodiment or by connecting an cooling-channel outlet in the supporting member 7 and a cooling-channel inlet in the electric motor 3 in direct contact with each other, as described in the second embodiment. Meanwhile, the supporting member 7 may have the structure illustrated in FIG. 11.

Here, the electric motor 3 has an inner-rotor structure, including a rotor that rotates as a drive shaft and a stator that generates rotating magnetic fields for rotating the rotor. The stator is fixed to the electric-motor housing 11 by shrink-fitting or the like. The rotor and the stator are both circular in cross section. Disposing the supporting member 7 on the outer periphery of the electric motor 3 forms areas where the distance between the supporting member 7 and the stator is long and areas where the distance is short. Since the supporting member 7 has a flat plate structure, the distance to the stator is short at the center of the supporting member 7 whereas the distance to the stator is long on the outer side.

Fastening is commonly used as a method of fixing the supporting member 7 to the electric-motor housing 11 in the case of an in-vehicle configuration. For the sake of reducing the vehicle weight, the electric-motor housing 11 is designed to be thin to such an extent as not to impair its strength. The electric-motor housing 11 is designed to be thin at, the portion between the supporting member 7 and the stator, which is not required to have significantly high strength under the in-vehicle conditions. The portion between the supporting member 7 and the stator is designed to be thin also due to a reason that the height of the device in the state of being mounted on the vehicle is desired to be as small as possible.

In the case of fixing the supporting member 7 to the electric-motor housing 11 by fastening, threaded holes are provided in the electric-motor housing 11 for convenience of manufacturing. In this case, since the electric-motor housing 11 is thin at portions where the distance between the stator and the supporting member 7 is short, making threaded hole there reduces the strength around them, which may possibly result in a loss of reliability in strength under the in-vehicle conditions and the stator shrink-fitted condition. However, the distance between the supporting member 7 and the stator increases from the center of the supporting member 7 toward the outer side thereof. Thus, forming a pedestal as the fastening and fixing portion 65 by making the electric-motor housing 11 thick on the outer side of the supporting member 7 can achieve both the fastening of the supporting member 7 and the reliability in strength of the electric-motor housing 11.

Figure 7:
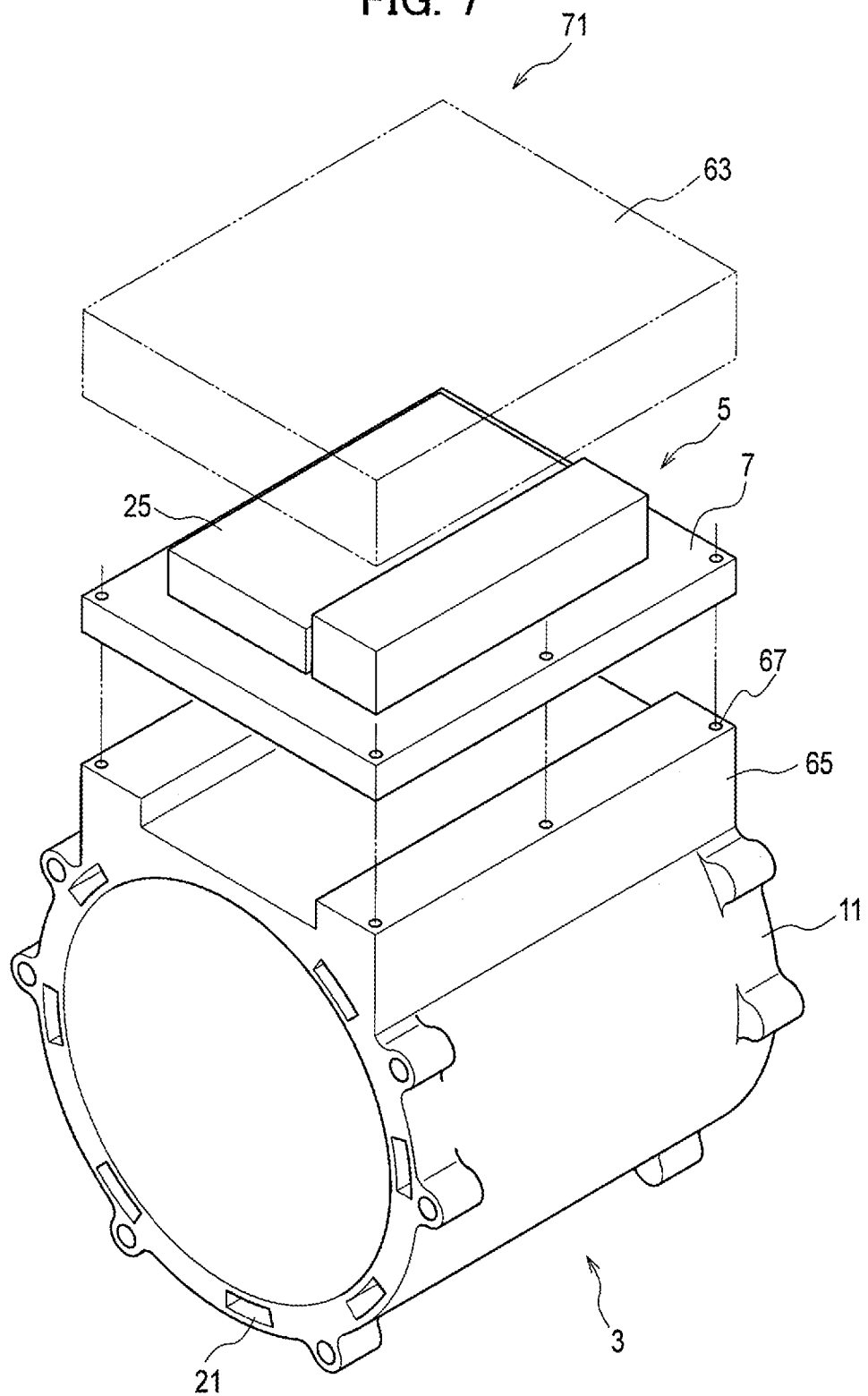
FIG. 7 is an exploded perspective view illustrating a structure of the in-vehicle drive device according to the third embodiment of the present invention.

Alternatively, as illustrated in FIG. 7, the supporting member 7 may be disposed with a space provided between the supporting member 7 and the electric-motor housing 11. Specifically, the height of the fastening and fixing portion 65 may be increased so as to provide a space (air layer) between the lower surface of the supporting member 7 and the upper surface of the electric-motor housing 11, so that they do not contact each other. The cooling channel 27 of the supporting member 7 and the cooling channel 21 of the electric motor 3 may be connected by using a pipe as the connecting pipe 39 in the first embodiment.

Here, the electric motor 3 generates heat due to the iron loss of the rotor, the iron loss of the stator core, and the copper loss of the exciting coils. Moreover, characteristics of the power module 25, the smoothing capacitor, the current sensor, the control board, and the like, which are electronic components, vary by temperature, and their heatproof temperatures are lower than those of the magnets of the rotor, the insulating material of the exciting coils, and the like. Thus, the electric motor 3 is water-cooled so that the heat generated by the electric motor 3 will not spread to its surroundings.

In this embodiment, in addition to the water-cooling of the electric motor 3, the upper surface of the electric-motor housing 11 and the lower surface of the supporting member 7 are out of contact with each other by providing a space (air layer). The presence of the air layer allows less heat transfer and can therefore reduce the transfer of the heat of the electric motor 3 to the supporting member 7.

Advantageous Effects of Third Embodiment

As described above in detail, in the in-vehicle drive device 61 according to this embodiment, the supporting member 7 is disposed on the cylindrical outer periphery of the electric motor 3. Moreover, the supporting member 7 is fixed to the electric motor 3 at positions where the distance between the electric motor 3 and the supporting member 7 is long due to the cylindrical shape of the electric motor 3. Hence, it is possible to fix the supporting member 7 while ensuring the reliability in strength of the electric motor 3.

Also, in an in-vehicle drive device 71 according to this embodiment, the supporting member 7 is disposed with a space provided between the supporting member 7 and the electric motor 3. This can reduce the transfer of the heat of the electric motor 3 to the supporting member 7. Hence, it is possible to reduce the thermal interference between the electric motor 3 and the group of electronic components.

Fourth Embodiment

Next, an in-vehicle drive device according to the fourth embodiment of the present invention will be described with reference to drawings. Note that the same constituent components as those in the first to third embodiments will be denoted by the same reference signs, and detailed description thereof will be omitted.

[Configuration of In-Vehicle Drive Device]

Figure 8:
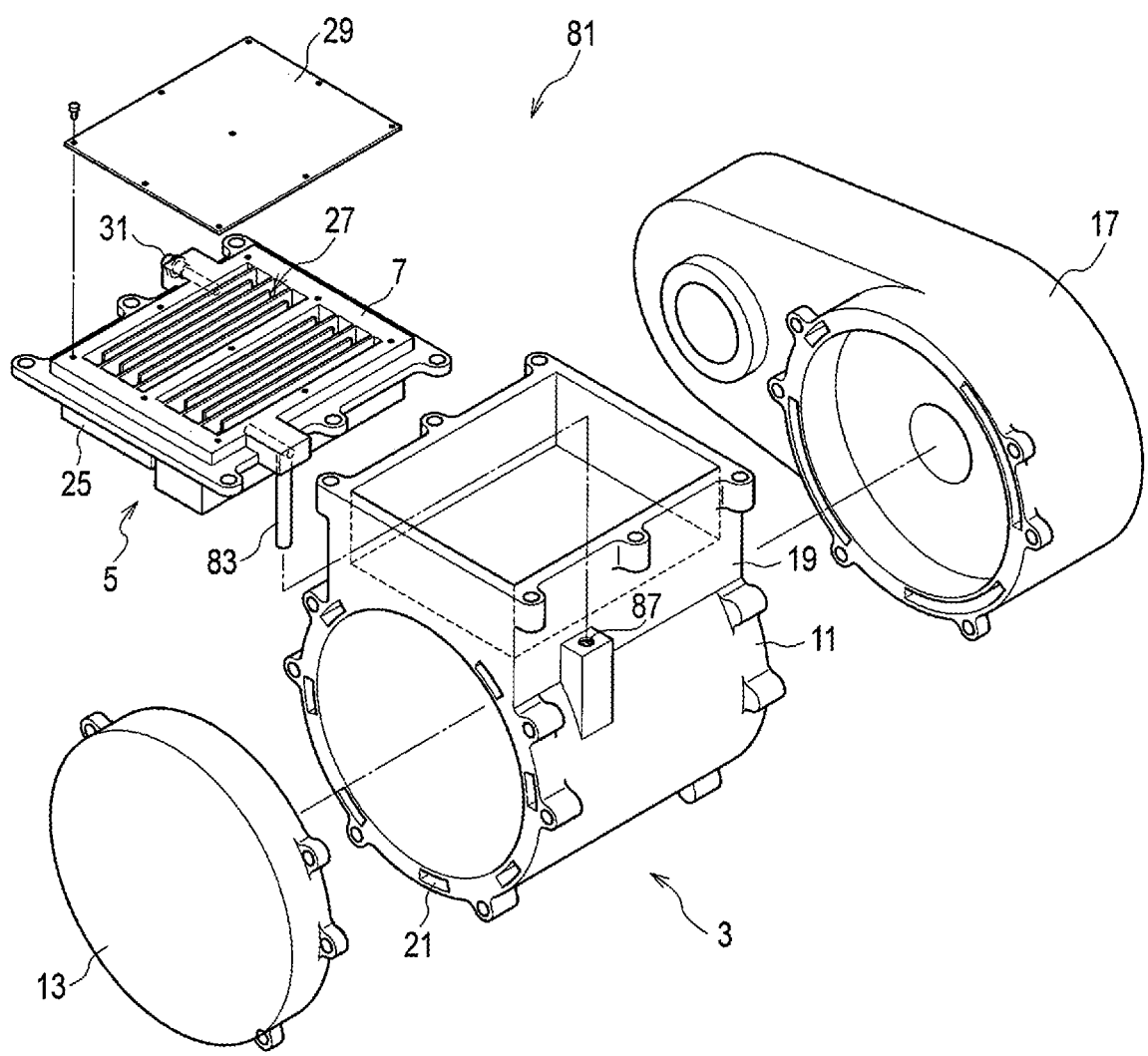
FIG. 8 is an exploded perspective view illustrating the structure of an in-vehicle drive device according to a fourth embodiment of the present invention.
Figure 9:
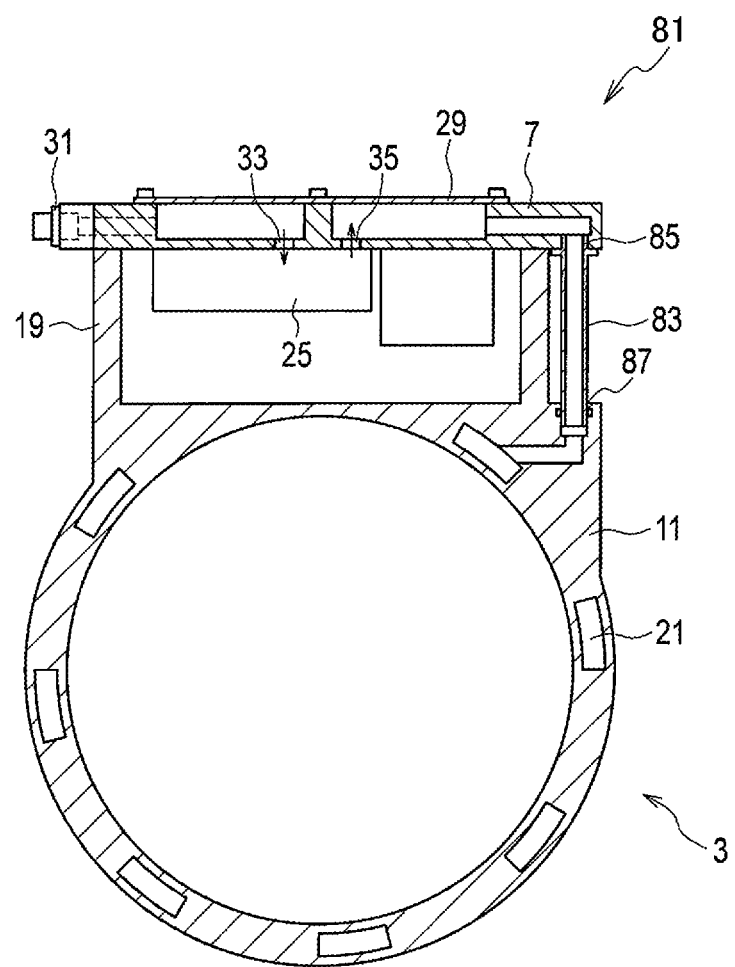
FIG. 9 is a cross-sectional view illustrating the structure of the in-vehicle drive device according to the fourth embodiment of the present invention.

FIG. 8 is an exploded perspective view illustrating the structure of the in-vehicle drive device according to this embodiment, and FIG. 9 is a cross-sectional view illustrating the structure of the in-vehicle drive device according to this embodiment. As illustrated in FIGS. 8 and 9, an in-vehicle drive device 81 according to this embodiment differs from the first to third embodiments in that a supporting member 7 is fixed such that the surface thereof on which a power conversion unit 5 is mounted faces an electric motor 3.

In this embodiment, the supporting member 7 is upside down, so that the back surface of the supporting member 7 serves as a lid that seals a housing portion 19. This can eliminate the top plate 15 in the first embodiment. Also, a cooling channel 27 in the supporting member 7 and a cooling channel 21 in the electric motor 3 are connected by a connecting pipe 83. The connecting pipe 83 is obtained, for example, by extending a bulge attached to the cooler and mounting shaft seals at the tips, and is disposed outside the housing portion 19 and connects a supporting-member channel outlet 85 and an electric-motor channel inlet 87. Meanwhile, the supporting member 7 may have the structure illustrated in FIG. 11.

When the supporting member 7 is mounted, the connecting pipe 83 is inserted into the electric-motor channel inlet 87 to unite them at the same time as mounting the entirety. In doing so, water-tightness is ensured with shaft sealing (rubber packing). For these operations, the operator may first perform positioning and preparatory operations so that the shaft sealing of the connecting pipe 83 will be achieved, and then bolt the supporting member 7 to fix it. In this way, the connecting pipe 83 can be connected at the same time as mounting the supporting member 7.

Advantageous Effect of Fourth Embodiment

As described above in detail, in the in-vehicle drive device 81 according to this embodiment, the supporting member 7 is fixed such that the surface thereof on which the power conversion unit 5 is mounted faces the electric motor 3. This eliminates components such as the top plate 15. Hence, it is possible to reduce the number of constituent components.

Fifth Embodiment

Next, an in-vehicle drive device according to the fifth embodiment of the present invention will be described with reference to a drawing. Note that the same constituent components as those in the first to fourth embodiments will be denoted by the same reference signs, and detailed description thereof will be omitted.

[Configuration of In-Vehicle Drive Device]

Figure 10:
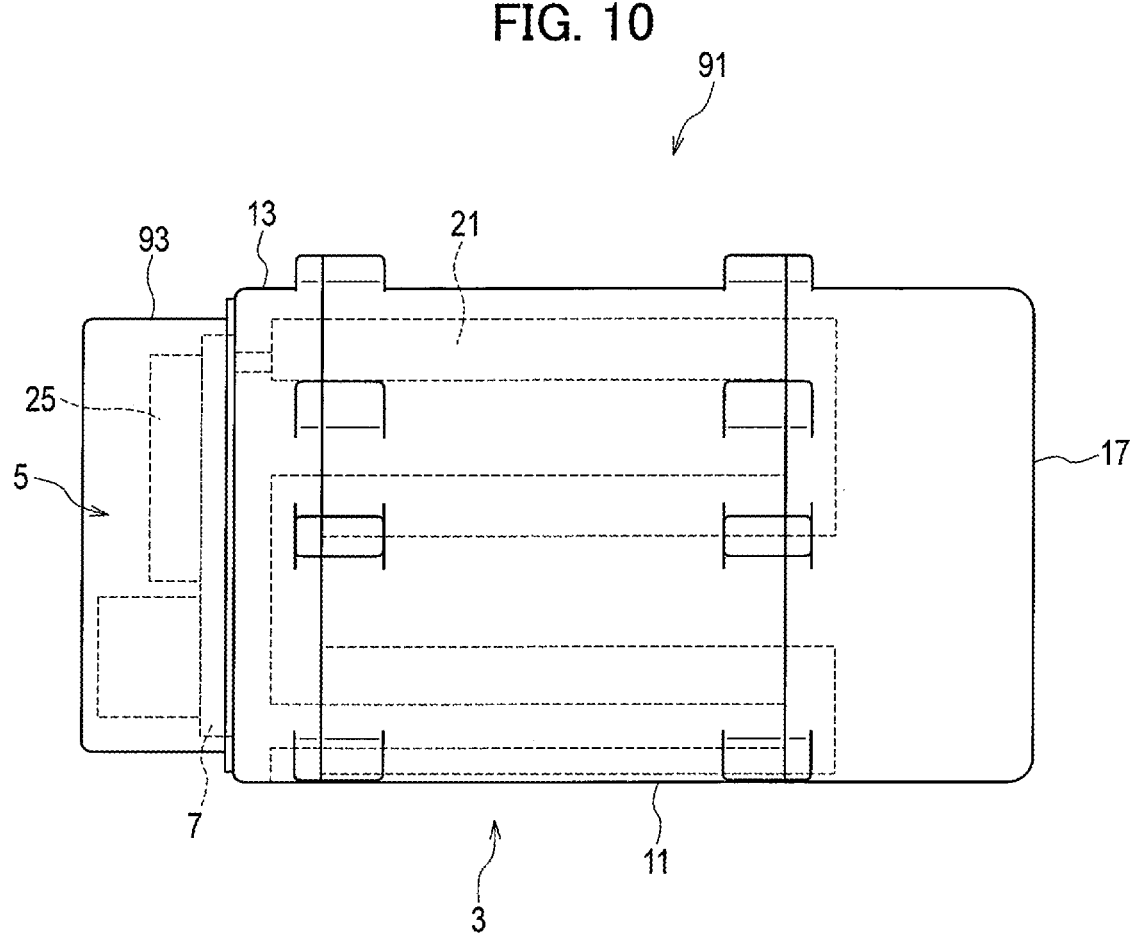
FIG. 10 is a side view illustrating the structure of an in-vehicle drive device according to a fifth embodiment of the present invention.

FIG. 10 is a side view illustrating the structure of the in-vehicle drive device according to this embodiment. As illustrated in FIG. 10, an in-vehicle drive device 91 according to this embodiment differs from the first to fourth embodiments in that a supporting member 7 is disposed on a lateral side of an electric motor 3.

In this embodiment, the supporting member 7 is fastened and fixed to a lateral side of an end plate 13 of the electric motor 3. Moreover, as in the above-described embodiments, the supporting member 7 allows a group of electronic components such as a power module 25 to be mounted thereon, and includes a supporting-member channel outlet at the back surface. A cooling channel 27 in the supporting member 7 is connected to a cooling channel 21 in the electric motor 3 through an electric-motor channel inlet in the end plate 13. The cooling channels of the supporting member 7 and the end plate 13 are connected by means of a face seal. Also, the supporting member 7 is covered by a housing case 93 together with the mounted power conversion unit 5.

In the other embodiments described above, the supporting member 7 is disposed on the outer periphery of the electric motor 3. Since the output shaft of the electric motor 3 is parallel to the drive shaft or propeller shaft of the vehicle, the electric motor 3 is parallel to the vehicle. For this reason, the supporting member 7 disposed on the outer periphery of the electric motor 3 is disposed on top of the electric motor 3 in parallel to the vehicle, thereby increasing the height of the device.

In contrast, in this embodiment, the supporting member 7 is disposed on a lateral side of the electric motor 3. Hence, the supporting member 7 is perpendicular to the output shaft of the electric motor 3 and perpendicular to the drive shaft or propeller shaft of the vehicle, and is therefore perpendicular to the vehicle as well. Thus, if the size of the supporting member 7 is within the height of the electric motor 3, the height of the in-vehicle drive device 91 is never greater than the height of the electric motor 3. Accordingly, the height of the in-vehicle drive device 91 can be kept small.

Advantageous Effect of Fifth Embodiment

As described above in detail, in the in-vehicle drive device 91 according to this embodiment, the supporting member 7 is disposed on a lateral side of the electric motor 3. Hence, it is possible to reduce the height of the in-vehicle drive device 91.

It is to be noted that the above-described embodiments are mere examples of the present invention. Hence, the present invention is not limited to the above-described embodiments but can be changed in various ways as modes other than these embodiments in accordance with the design and/or the like without departing from the technical idea of the present invention, as a matter of course.

REFERENCE SIGNS LIST

1, 41, 61, 71, 81, 91 in-vehicle drive device
3 electric motor
5 power conversion unit
7 supporting member
11 electric-motor housing
13 end plate
15 top plate
17 reducer
19 housing portion
21, 27 cooling channel
23 87 electric-motor channel inlet
25 power module
29 bottom plate
31 supporting-member channel inlet
33 power-module channel inlet
35 power-module channel outlet
37, 85 supporting-member channel outlet
39, 83 connecting pipe
51 channel board
53 supporting board
63, 93 housing case
65 fastening and fixing portion

The invention claimed is:

1. A drive device comprising:
   an electric motor including a cooling channel;
   a power conversion unit that converts electric power from a power supply and outputs electric power to be supplied to the electric motor; and
   a supporting member on which the power conversion unit is mounted,
   wherein the supporting member includes a cooling channel connected to the cooling channel of the electric motor,
   a power module of the power conversion unit includes a cooling channel, a channel inlet, and a channel outlet, such that cooling water flows from the cooling channel of the supporting member into the cooling channel of the power module through the channel inlet and returns into the cooling channel of the supporting member through the channel outlet,
   the cooling channel of the supporting member is formed inside the supporting member in the shape of a groove-shaped channel extending back and forth in a serpentine manner, and
   the cooling channel of the supporting member connects the cooling channel of the electric motor and the cooling channel of the power module.

2. The drive device according to claim 1, wherein an outlet of the cooling channel of the supporting member is connected in direct contact with an inlet of the cooling channel of the electric motor.

3. The drive device according to claim 1, wherein
   the electric motor is in a cylindrical shape,
   the supporting member is disposed on a cylindrical outer periphery of the electric motor, and
   the supporting member is fixed to a pedestal formed on the electric motor at an outer side of the supporting member.

4. The drive device according to claim 3, wherein the supporting member is disposed such that a space is provided between the supporting member and the electric motor.

5. The drive device according to claim 1, wherein the supporting member is fixed such that a surface thereof on which the power conversion unit is mounted faces the electric motor.

6. The drive device according to claim 1, wherein the supporting member is formed of an elastic body.

7. The drive device according to claim 1, wherein the supporting member is fixed to the electric motor with an elastic body interposed therebetween.

8. The drive device according to claim 1, wherein the supporting member is disposed on a lateral side of the electric motor.

* * * * *